United States Patent [19]
Werbrouck

[11] Patent Number: 5,798,917
[45] Date of Patent: Aug. 25, 1998

[54] CONTROL PROCESS FOR CLOSED-CIRCUIT DRY-METHOD GRINDER

[75] Inventor: Vincent Werbrouck, Thorembais-Saint-Trond, Belgium

[73] Assignee: Slegten Societe Anonyme, Louvain-la-Neuve, Belgium

[21] Appl. No.: 530,281

[22] PCT Filed: Feb. 25, 1994

[86] PCT No.: PCT/EP94/00552

§ 371 Date: Dec. 7, 1995

§ 102(e) Date: Dec. 7, 1995

[87] PCT Pub. No.: WO94/20217

PCT Pub. Date: Sep. 15, 1994

[30] Foreign Application Priority Data

Mar. 3, 1993 [EP] European Pat. Off. ............. 93870040

[51] Int. Cl.⁶ .................. G05B 13/02; B02C 4/32
[52] U.S. Cl. .............. 364/148; 364/166; 241/33; 241/34
[58] Field of Search .............. 364/474.06, 468.05, 364/468.13, 478.01, 148, 152–150, 160, 166; 241/33–37, 30, 134, 135, 137

[56] References Cited

U.S. PATENT DOCUMENTS

| | | | |
|---|---|---|---|
| 4,267,981 | 5/1981 | Rowland, Jr. | 241/30 |
| 4,586,146 | 4/1986 | Dumbeck et al. | 241/33 |
| 4,611,763 | 9/1986 | Tomiyasu et al. | 241/30 |
| 4,640,464 | 2/1987 | Musto et al. | 241/34 |
| 5,269,468 | 12/1993 | Graenicher et al. | 241/37 |
| 5,454,520 | 10/1995 | Folsberg | 241/30 |

FOREIGN PATENT DOCUMENTS

| | | |
|---|---|---|
| 0 328 678 | 8/1989 | European Pat. Off. |
| 2 672 517 | 8/1992 | France |

OTHER PUBLICATIONS

Proceedings of the Eight Triennial Congress of the International Federation of Automatic Control. vol. 5, 08–24–81; Japan, pp. 2851–2857; J. Koudstaal et al; The Application of a Multivariable Controller to an Industrial Grinding Circuit.

Nouvel Automatisme, No. 34, Dec. 1982, Paris pp. 71–74. J. Rajot Surveillance en Temps Reel D'Un Atelier de Broyage et classification.

*Primary Examiner*—Reba I. Elmore
*Assistant Examiner*—Thomas E. Brown
*Attorney, Agent, or Firm*—Jacobson, Price, Holman & Stern, PLLC

[57] ABSTRACT

Control process intended for closed-circuit, dry-method grinding installations which essentially comprises a batching device for feeding of raw materials, a grinder, an adjustable-speed dynamic separator, means for bringing to the separator the matter coming from the grinder, means for returning to the grinder the insufficiently ground matter coming from the separator which is termed oversized from the separator, means for conveying the finished product, a flowmeter for the oversize from the separator, and means for measuring a datum dependent on the feeding of the separator.

8 Claims, 7 Drawing Sheets

6b

6c

6d

6a

7a

7b

CONTROL PROCESS FOR CLOSED-CIRCUIT DRY-METHOD GRINDER

SUBJECT OF THE INVENTION

The subject of the invention is a control process for closed-circuit, dry-method grinding installations which essentially comprise a batching device for the feeding of raw materials, a grinder, an adjustable-speed dynamic separator, means for bringing to the separator the matter coming from the grinder, means for returning to the grinder the insufficiently ground coarse matter and means for conveying the finished product to the exit of the separator.

The present invention also relates to the applications of the control process.

State of the Art

The present invention is intended for closed-circuit, dry-method grinding installations, and preferably for installations comprising a rotary ball mill used for the manufacture of cement. Such, grinders have ever greater capacities, some of them expending more than 8000 kW. The installations required to rotate such grinders are extremely costly in terms of investment and energy. For them to be cost-effective, demands:

- the finished product be of high quality,
- maximum flow rate,
- minimum electrical consumption,
- minimum maintenance.

It is generally recognized that, for modern grinding installations, the most cost-effective investment is a good control device which regularises the fineness of the finished product and thereby makes it possible to reduce the safety margin between the average quality produced and the required quality. By reducing this margin the capacity of the installation is increased; a few per cent gained in flow rate achieves a very sizable saving in the costs of operation and recouping of the investment.

Modern closed-circuit, dry-method grinding installations essentially include a batching device for the feeding of raw materials, a grinder, an adjustable-speed dynamic separator, means of transport (generally including an elevator) for conducting the ground matter from the grinder to the dynamic separator, means of transport for returning the coarse matter (oversize from the separator) to the grinder and means of transport for conveying the finished product.

In order to avoid expelling dust and in order to cool the installation, the grinder is moreover provided with a ventilating device.

Dynamic separators operate through the combined effects of the rotation of a distributing plate, of a selection device and of a current of ventilating air passing through the separator This current of ventilating air within the separator can be created by a fan internal or external to the said separator.

When the fan is internal to the separator, the separating of the air and of the finished product takes place fully inside the separator.

When the fan is external, the separating of the air and the finished product takes place in one or more cyclones outside the separator and/or in a device for removing dust in bags. The separators with external fan exhibit better efficiency and allow better cooling of the treated product. At present, modern installations are generally provided with this type of separator.

Some installations having a separator with internal fan are furnished with a complementary external fan for cooling the system but which is however inefficient and hence this solution is no longer used in recent installations.

It should be noted that a grinding installation is subject to numerous disturbances, including:

- variations in the grindability of the fed products (raw materials);
- deficiencies, such as a shortcoming in the feeding of raw materials;
- disturbances in the transport circuits (overflow, choking);
- mechanical problems;
- variations in the level of the grinding charge in the grinder which modify the latter's grinding capacity;
- etc.

Any disturbance or lack of stability in a grinding installation can cause a variation in the quality of the finished product and in the yield of the grinder bringing about a downgrading of a certain quantity of product and consequently a loss in production.

To eliminate or reduce these disturbances, grinding installations must be controlled as efficiently as possible.

The principal object of a control process for grinding installations is to ensure the greatest possible constancy of the quality of the finished product. This quality depends essentially, on the one hand, on the chemical composition of the product, which must be ensured by proper batching of the constituents, and on the other hand, on the fineness of the finished product, that is to say on the efficiency of the dynamic separator.

It is chancy to measure continuously the fineness of the finished product; indeed, the apparatus available for this measurement are often unreliable or may not economically give sufficiently close measurements.

In practice the fineness of the finished product exiting a separator in a good state of maintenance is considered to depend on the flow rate of air passing through the separator, on the quantity and on the fineness of the matter fed to the separator as well as on the speed of rotation of the said separator.

When the fan of the separator is outside, it is possible to measure the separator air flow rate and therefore it is relatively easy to control it. The speed of rotation of the separator is also readily measurable and controllable.

The problem of controlling the quantity and/or the fineness of the material fed to the separator is more complex. Indeed, any disturbance arising in the grinding circuit has the effect of modifying the quantity and/or fineness of material fed to the separator, thus varying the quantity and/or fineness of the finished product and the quantity and/or fineness of the oversize from the separator. This causes a chain-like cycle of disturbances.

In order to detect the disturbances it in possible to measure the flow rate of oversize from the separator, the power expended by the elevator feeding the separator (this making it possible to estimate the flow rate of material fed to the separator), the flow rate of finished product, and the noise emitted by the chambers of the grinder.

Numerous strategies have been used to control the feeding of the separator, in particular:

- maintaining the sum of the oversize from the separator and the feeding of raw materials constant by acting on the raw materials feed flow rate;
- maintaining the oversize constant by acting on the raw materials feed;
- maintaining the oversize constant by acting on the speed of rotation of the separator;
- maintaining the power of the elevator constant by acting on the raw materials feed (the noise emitted by the grinding chambers is sometimes used to anticipate the variations in the power of the elevator)

These strategies have enabled the stability of the installations and the constancy of the quality of the finished product to be improved. However, sizable fluctuations persist. The time for regaining equilibrium after a sizable disturbance remains relatively long. The optimization achieved with the existing processes is imperfect. Certain disturbances may bring about underfeeding of the grinder, and this may seriously damage its interior equipment (screens, partitions, balls), and reduce the useful percentage of utilization of the installation.

The imperfection in the processes proposed in the state of the art stems from the variation in one parameter causing a chain-like variation in other parameters and from the interactions between the various parameters being poorly taken into account when formulating the process. The same is the case during the delay between the corrective actions and the measuring of the fluctuations.

Aims of the Invention

The main aim of the present invention is to propose a control process for closed-circuit, dry-method grinding installations which takes into account the interaction of the principal operating parameters and which makes it possible to muster the actions for correcting characteristic fluctuations in the grinding installation.

In particular the present invention aims to propose a process which makes it possible to obtain maximum stabilization of the quality of the finished product whilst optimizing the flow rate thereof; to make economical use of the energy consumed; to avoid running conditions which compromise the duration and wear of the equipment; and to make the running of the installation easy and more certain.

Principal Characteristic Elements of the Invention

The control process according to the present invention is intended for closed-circuit, dry-method grinding installations which essentially comprise a batching device for the feeding of raw materials, a grinder, an adjustable-speed dynamic separator, means for bringing to the separator the matter coming from the grinder which is termed feeding of the separator, means for returning to the grinder the insufficiently ground matter coming from the separator which is termed oversize from the separator, means for conveying the finished product, a flowmeter for the oversize from the separator, and means for measuring a datum dependent on the feeding of the separator;

the said process being characterized in that it is activated by:

a setting value (a) for the flow rate of oversize from the separator, an auto-adjustable setting value (b) for the datum dependent on the feeding of the separator, a reference value (c) for the speed of the separator;

and in that the flow rate of oversize from the separator and the datum dependent on the feeding of the separator are controlled simultaneously with the aid of a multivariable regulator by acting on the speed of the separator and on the batching of the feeding of raw materials and in that the speed of the separator is compared periodically with the reference value (c) with the aid of a calculator when the regulator maintains the flow rate of oversize from the separator and the datum, dependent on the feeding of the separator in the neighbourhood of the setting values (a) and (b) respectively; the calculator adjusting the setting value (b) of the datum dependent on the feeding of the separator in such a way that the actual speed of the separator corresponds to the reference value (c) when the regulator has established the setting value (a) of the flow rate of the oversize and the adjusted setting value (b) of the datum dependent on the feeding of the separator.

According to a first embodiment of the present invention, the datum dependent on the feeding of the separator is the flow rate of the feeding of the separator.

According to another preferred embodiment, a finished product flow rate setting can be used directly in place of the separator feed flow rate setting, given that the sum of the oversize and finished product flow rates, is, in the case of balanced operation, equal to the separator feed flow rate. Indeed, the matter arriving at the separator is usually fed by an elevator and in practice it is difficult to estimate with high accuracy the flow rate of matter conveyed by this elevator. Weighing the matter on entering and leaving the elevator often requires an increase in the height of the building which comprises the grinding installation; this is extremely costly, whereas a flowmeter for measuring the flow rate of the finished product is easily installable.

The process of the invention is applied preferentially to the grinding of cement with the aid of a ball mill. To each quality of cement there corresponds a proportional batching of the various ingredients—e.g. (p1) for the cement clinker, (p2) for the slag and (p3) for the gypsum—and a fineness of cement meal which are known to the manufacturer. Historically, for a given quality—containing e.g. (p1) of clinker (p2) of slag and (p3) of gypsum—the yield of the grinder and the grain-size distribution (fineness) of the finished product are best for a flow rate of oversize (a) from the separator. With this oversize flow rate (a), the required fineness is obtained for a reference speed (c) of the separator and, again historically, the capacity of the installation corresponds to a flow rate close to (b), for the datum dependent on the feeding of the separator (the raw materials feed flow rate of the installation is equal to (b) in the case where the datum dependent on the feeding of the separator is the flow rate of the finished product).

It has been seen that any disturbance to the circuit has the effect of modifying the quantity and/or fineness of the product fed to the separator and that this modifies the quantity and/or fineness of the finished product, and consequently those of the oversize from the separator, thus causing a chain-like cycle of disturbances.

The control process according to the present invention rests upon the observation that the earliest reliable measurable manifestations of a nascent disturbance are a variation in the datum dependent on the feed to the separator and on the flow rate of oversize. In consequence, with a view to maintaining stability, the process according to the invention makes it possible simultaneously to control the datum dependent on the feed to the separator and the flow rate of oversize; to do this a multivariable regulator acts on the speed of the separator and on the raw materials feed flow rate. This implies that the speed of the separator deviates momentarily from the reference value (c) and that the raw materials feed flow rate deviates from the setting value (b) of the finished product flow rate (in the case where the datum dependent on the feeding of the separator is the finished product flow rate). However, if the capacity of the installation does not deviate in a lasting manner from the historical norms, the multivariable regulator rapidly re-establishes the setting values (a) and (b) with a separator speed which is very close to the reference value (c). At equilibrium the raw materials feed flow rate again becomes equal to (b). The examples set out later show the efficiency of the process.

In the case where the capacity of the installation deviates lastingly from the historical data—e.g. because the grindability of the raw materials feed has changed, or because the grinder's ball charge has dropped owing to wear—then, when the multivariable regulator has re-established the setting values (a) and (b) and when the installation is balanced, the speed of the separator is no longer equal to the reference value (c). The calculator periodically compares the actual speed of the separator with the reference value (c) when the regulator maintains the oversize flow rate and the datum dependent on the feed to the separator in the neighbourhood of the setting values (a) and (b); if the actual speed of the separator then diverges from the reference value (c), the calculator adjusts the setting value (b) so as to bring the actual speed of the separator back to the reference value (c). The control process makes it possible to adapt in this way to any lasting change in the capacity of the installation.

According to a preferred embodiment, the multivariable regulator is constructed from a mathematical process model establishing the relations existing between the raw materials feed flow rate $u_a$ and the speed of the separator $u_s$ as control variables and the flow rates of oversize $y_r$ and of finished product $y_f$ (chosen as the datum dependent on the feeding of the separator) as magnitudes to be controlled; the said model being specified by the system of equations:

$$t_{11}\frac{dy_f}{dt} + y_f = k_{11}u_a \quad (1)$$

$$t_{12}\frac{dy_f}{dt} + y_f = k_{12}\frac{du_s}{dt} \quad (2)$$

$$t_{21}\frac{dy_r}{dt} + y_r = k_{21}u_a \quad (3)$$

$$t_{22}\frac{dy_r}{dt} + y_r = k_{22}u_s \quad (4)$$

in which, the parameters $t_{11}$, $t_{12}$, $t_{21}$, and $t_{22}$ are the time constants of the process. These equations make it possible to determine the time needed by the process to revert to a steady situation after a disturbance.

The parameters $k_{11}$, $k_{12}$, $k_{21}$ and $k_{22}$ are the process gains which express the ratios between the steady values of an output variable ($y_f$ or $y_r$) and an input variable ($u_a$ or $u_s$).

According to the preferred embodiment described above, the multivariable regulator is linear quadratic and its control minimises a quadratic cost criterion relating it to the internal state.

Although the control process according to the invention is applied preferentially to installations with high-efficiency separator possessing an external fan, the said process can also be used with internal-fan separators (with or without additional ventilation) on condition that the unit for driving the distributing plate/selection device assembly is independent of that of the fan and that the speed of the first is adjustable.

When the separator has an external fan, the control process can be used with a fully open air circuit in which any air entering the separator is exhausted through a dust-removal device and a chimney downstream of the fan; or with a partially or fully closed air circuit in which some or all of the air entering the separator is recirculated after flowing through one or more cyclones; some of the air sucked into the separator possibly coming from the grinder or the auxiliary installations (elevator, air chute, etc.).

Advantageously, with the control process according to the invention, the flow rate of air passing through the separator is controlled, but the process according to the invention can also be used without controlling the air flow rate, especially when the air is recirculated in an external-fan separator, or when the separator has an internal fan.

Preferably, the control process of the invention is used for cement milling installations comprising a ball mill, but it can also be used with other types of mills, such as a pressure mill, and with materials other than cement.

The control process according to the invention regularises the running of the separator and hence the fineness of the finished product, by stabilizing the flow rates of feed to the separator and of oversize from the separator. Thereby, the quality of the product is promoted.

The auto-adjustment of the setting value (b) of the datum dependent on the feeding of the separator maintains the raw materials feed flow rate as near as possible to the maximum capacity of the installation, this making it possible to obtain a maximum flow rate.

Since the fineness is closely controlled and the flow rate is maximized, electrical consumption is at a minimum.

The charge circulating in the grinder can be chosen such that the grinder is fed sufficiently to avoid deterioration of its interior equipment, this charge is closely controlled, resulting in a reduction in maintenance.

DESCRIPTION OF A PREFERENTIAL EMBODIMENT OF THE INVENTION

Figure 1:
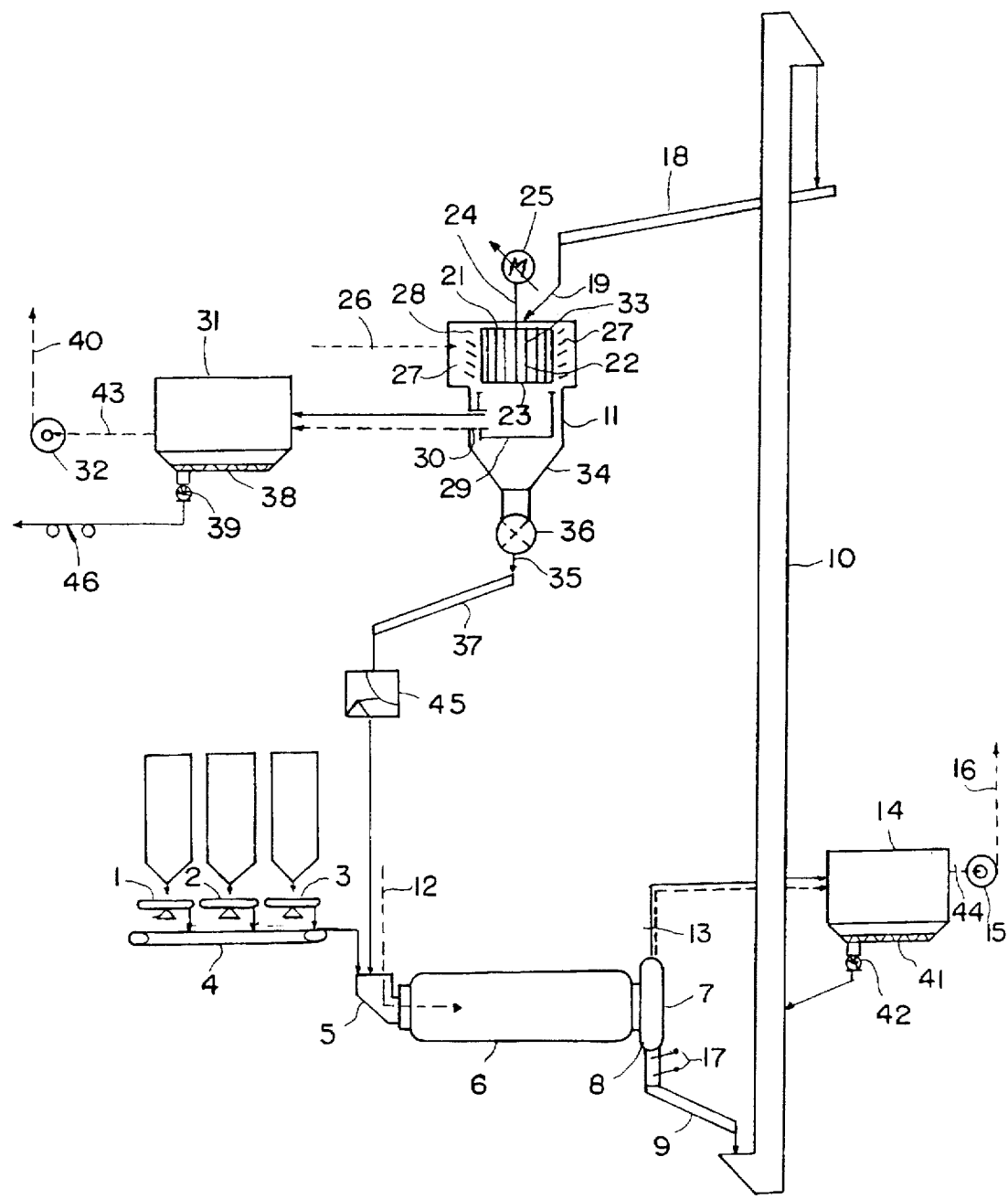
FIG. 1 represents diagrammatically a ball milling installation intended for the manufacture of cement. It is suited to the use of a control process according to the invention.

FIG. 1 represents diagrammatically a cement milling installation suited to the use of a control process according to the invention. A preferred embodiment of the process is described below in detail for the said installation.

A device comprising a batcher 1 of cement clinker, a batcher 2 of slag, and a batcher 3 of gypsum feeds the installation with raw materials.

From the batchers, the raw materials are conducted by a belt 4 into the hopper 5 and enter a ball mill 6. Rotary ball mills are well known, their constructional features and interior equipment are not described.

From the mill 6 the ground matter is discharged into a hood 7 which it exits through the base 8 heading for an air chute 9 and heading for an elevator 10 which feeds a dynamic separator 11 via an air chute 18.

An air sweeping current 12 enters the hopper 5, passes through the mill 6, exits it heading for the hood 7, and is sucked at 13 into a pipe which brings it to the dust-removal device 14, to the suction fan 15, and to the exhaust chimney 16. The mill is thus maintained under slight vacuum so as to prevent the emission of dust. On the other hand, the air cools the mill 6 which, during operation, converts some of the energy consumed into eat. A double valve 17 isolates the bottom of the hood 7, to enable the ground matter to travel towards the elevator whilst maintaining the mill under vacuum. The dust collected in the dust-removal device 14 is brought to the elevator 10 by the worm 41 and the isolating valve 42.

The dynamic separator 11 is of the revolving cage type. FIG. 1 represents a well-known model of caged separator. Other types of cage separator exist, and their principle of operation is similar. The matter is fed in at 19 and falls onto the top 21 of the cage. The latter is cylindrical, its upper face 21 forms a circular plate which serves as distributing plate, its periphery is formed of mutually separated bars 22, and its lower face 23 is open. The cage is hung from a shaft 24 linked to the variable-speed drive 25 situated above the separator. The matter is centrifuged through the rotation of the cage and rains down in front of the bars 22. The separator is traversed by an air current sucked in from outside at 26, is distributed throughout the circumference through a pipe 27 of decreasing cross-section, and directional paddles 28 conduct the air around the cage. Facing the open lower portion 23 of the cage is a cylindrical fixed box 29 open at the top and closed at its periphery and at the bottom. A pipe 30 links the inside of the box to the outside of the separator, off to a bag dust-remover 31. A seal, not shown, ensures leaktightness between the fixed box and the revolving cage. The air sucked in at 26 and distributed around the cage enters the cage through the gaps 33 between the bars 22. Between the paddles 28 and the cage the air passes through the matter which descends around the cage, and it preferentially entrains the finest particles. The coarse particles conveyed by the air to the bars progress more slowly than the fine particles, most of the coarse particles are impacted by the bars and sent back towards the outside of the cage.

The lower portion of the separator forms a cone 34 which gathers the particles not entrained by the air to the inside of the cage, they leave the separator at 35, through a rotary valve 36 which prevents the entry of unwanted air. The particles which exit at 35 constitute the oversize and are returned to the entrance of the mill via an air chute 37. The air/cement mixture which passes through the cage is treated in the dust-remover 31 which separates the cement from the air. The cement retained in the dust remover is evacuated by the worm 38 and the isolating valve 39 and constitutes the finished product; the purified air is sucked in by the fan 32 which maintains the separator under vacuum, and is exhausted via the chimney 40.

In the installation of FIG. 1, the air flow rates sucked into the separator and mill are measured at 43 and at 44 respectively, and can be adjusted by paddles to the suction of the fans, or by varying the speed of their motor.

A regulating loop maintains the air flow rate passing through the separator constant, whatever the loss of head in the circuit.

Another regulating loop maintains the flow rate of air through the mill constant, indeed the loss of head in a mill varies leading, without regulating the air, to fluctuations in the flow of the matter.

The oversize from the separator is measured by an impact flowmeter 45.

The discharge of the finished product at the exit of the dust-remover is furnished with a weigher 46.

According to a preferred embodiment, the control process is activated by:

a setting value (a) for the flow rate of the oversize 45, an auto-adjustable setting value (b) for the flow rate of the finished product 46, a reference value (c) for the speed of the motor 25 of the separator 11.

The multivariable regulator which simultaneously controls the flow rate 45 of oversize from the separator and the flow rate 46 of finished product is constructed from the mathematical model described by equations [(1), (2), (3), (4)] mentioned earlier.

In order to develop the regulator, equations [(1), (2), (3), (4)] are written in the form of first-order differential equations in so-called state variables so as to carry out the calculations readily by computer.

The representation of the model by means of state variables fully describes the process, including its internal elements. In this way, the internal oscillations as well as the instabilities which may be hidden if merely the inputs and outputs are considered are taken into account. Optimal control theory can be implemented, and a representation by internal reference model is carried out.

The differential equations for the state variables which represent the process have the following standard form:

$$\dot{x} = Ax + Bu \qquad (5)$$

$$y = Cx + Du \qquad (6)$$

where x is the vector of system state variables, x is the vector of derivatives of these state variables, u is the vector of system inputs, y is the vector of system outputs, A, B, C, D are the matrices constituting the equations.

$$A = \begin{pmatrix} -1/t_{11} & 0 & 0 & 0 \\ 0 & -1/t_{12} & 0 & 0 \\ 0 & 0 & -1/t_{21} & 0 \\ 0 & 0 & 0 & -1/t_{22} \end{pmatrix}$$

$$B = \begin{pmatrix} k_{11}/t_{11} & 0 \\ 0 & -k_{12}/t_{12}^2 \\ k_{21}/t_{21} & 0 \\ 0 & k_{22}/t_{22} \end{pmatrix}$$

-continued $$C = \begin{pmatrix} 1 & 1 & 0 & 0 \\ 0 & 0 & 1 & 1 \end{pmatrix}$$

$$D = \begin{pmatrix} 0 & k_{12}/t_{12} \\ 0 & 0 \end{pmatrix}$$

The regulator which implements the process of the invention is a multivariable linear quadratic regulator. Multivariable since two outputs (the finished product flow rate and the oversize flow rate) and two inputs (the raw material feed flow rate and the speed of the separator) are used. Linear since its entire design is based on the theory of linear systems. Quadratic since the design criterion is a criterion which involves the square of the input variables and the square of the state variables.

The linear quadratic regulator is optimal when the performance index or criterion:

$$J = \sum_{0}^{\infty} (x_j^T Q x_j + U_j^T R U_j) \quad (7)$$

is a minimum for the system described in the form of the following state equations:

$$x = Ax + Bu \quad (8)$$

$$y = Cx + Du \quad (9)$$

Q and R being weighting factors chosen by the designer at the time of set-up of the control process.

It can be proven that the regulator which minimises the criterion J is given by the following linear relation:

$$u = Kx \quad (10)$$

where the optimal value of the gain K is obtained by solving the Riccati equation (11) which results from combining the J criterion (7) and the state equations (8), (9) and the optimal solution (10) of the J criterion (7):

$$K = KA + A^T K - KBR^{-1} B^T K + Q \quad (11)$$

where

K is the gain,

K is the derivative of the gain,

A and B are the matrices of the state representation of the system,

Q and R are the weightings of the quadratic criterion J.

The regulator described above calls upon the state variables, however they are not all measurable and hence a system must be implemented which will reconstruct the unavailable states. The method used to reconstruct the states consists in taking the difference between the measured outputs and the estimated outputs so as to continuously correct the model based on the state variables.

The classical method of state reconstruction is the Kalman filter which is based on the same method as that used to establish the linear quadratic regulator (LQ), namely finding a gain L between the abovementioned differences and the state variables.

The control (speed of the separator and raw materials feed flow rate) of the multivariable linear quadratic regulator (LQ) is such that it minimises a quadratic cost criterion relating it to the internal state. Its construction includes two phases:

1) Calculation of the gain L of an observer of the internal state from measurements of the outputs $y_f$ and $y_r$. The gain L which depends on the choice of two positive semi-definite symmetric weighting matrices $Q_1$ and $R_1$.

2) Calculation of the gain K of the linear regulator U=−Kx which minimises the quadratic criterion:

$$J = \sum_{0} (x_j^T Q_2 x_j + U_j^T R_2 U_j) \quad (12)$$

where x is the vector of internal states and U the control, and where $Q_2$ and $R_2$ are 2 positive semi-definite symmetric weighting matrices.

At each instant, the calculator will compare the true speed of the separator with the reference value (c) of the speed fixed previously.

From this comparison will result the difference between these two magnitudes. This difference will be inserted into an equation which will give as result the adjusted setting value (b) of finished product flow rate which will cancel out the difference.

This equation can be of many types, such as equation (13) which represents a proportional integral regulator (PI) in which the proportional action will give the instantaneous proportion between the error (the difference between the reference value of speed and the measured value) and the flow rate (b) to be applied. The integral action will allow cancellation of that portion of the error due to an outside disturbance which causes a permanent error which cannot be cancelled by a pure proportional action:

$$u_t = u_{t-1} + K_p(y_{t-1} - y_t) + K_i(y_{ct} - y_t) + K_d(2y_{t-1} - y_t - y_{t-2}) \quad (13)$$

where $t_{-1}$: corresponds to the current instant less one control period, $t_{-2}$: corresponds to the current instant less two control periods, $u_t$: is the control at the instant t, $u_{t-1}$: is the control at the instant t-1, $y_t$: is the measurement at the current instant, $y_{t-1}$: is the measurement at the current instant less one control period, $y_{t-2}$: is the measurement at the current instant less two control periods, u is the finished product flow rate setting or the flow rate of material to be produced by the installation, y is the speed of the separator.

Since control is effected by means of a computer the actions are instantaneous. The time which separates two actions is called the control period (tc), t corresponding to the current instant.

Figure 2:
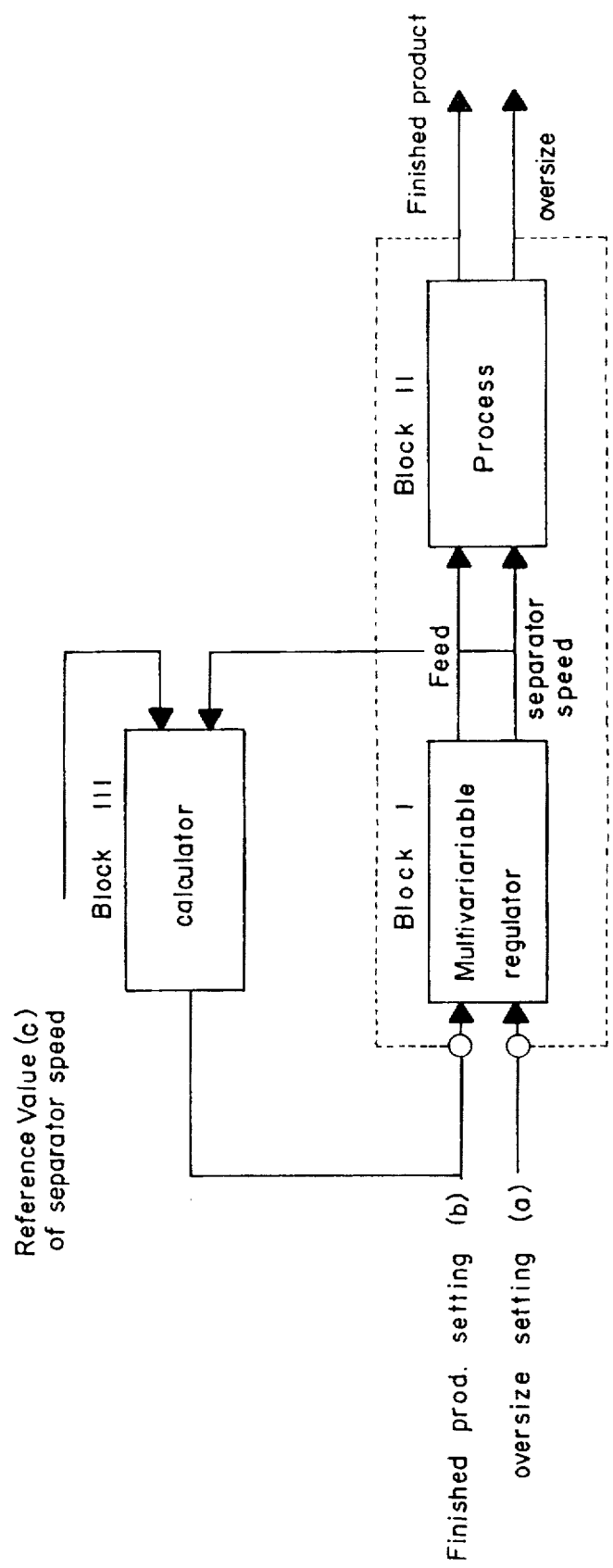
FIG. 2 represents through a chart the multivariable regulator together with the calculator for a control process according to the invention.

The multivariable regulator together with the calculator will be summarised with the chart of FIG. 2.

Block II represents the installation whose inputs are the raw materials feed flow rate and the speed of the separator and whose outputs (measured magnitudes) are the finished product flow rate and the oversize flow rate.

Block I represents the multivariable linear quadratic regulator which calculates a raw materials feed flow rate and a separator speed so as to cancel out the differences between the setting (b) and the measurement of the finished product flow rate and between the setting (a) and the measurement of the oversize flow rate.

The oversize flow rate setting (a) is fixed by the user and the finished product setting (b) is given by the calculator (block III).

Block III represents the calculator which calculates the auto-adjustable setting (b) of finished product flow rate on the basis of the difference between the reference value (c) of speed of the separator and the measurement of the true speed of the separator.

The reference value (c) of the speed of the separator is fixed by the user.

When implementing the control system it is necessary to establish:

1. The Parameters of the Model

In order to determine the relations which link all the variables of the system of equations [(1), (2), (3), (4)]; namely:

the raw material feed flow rate $u_a$ the speed $u_s$ of the separator, the finished product flow rate $y_f$, the oversize flow rate $y_r$, two trials are performed, the first constitutes a step action on the raw materials feed flow rate while maintaining the speed of the separator constant and the second constitutes a step action on the speed of the separator while maintaining the raw materials feed flow rate constant.

Figure 3:
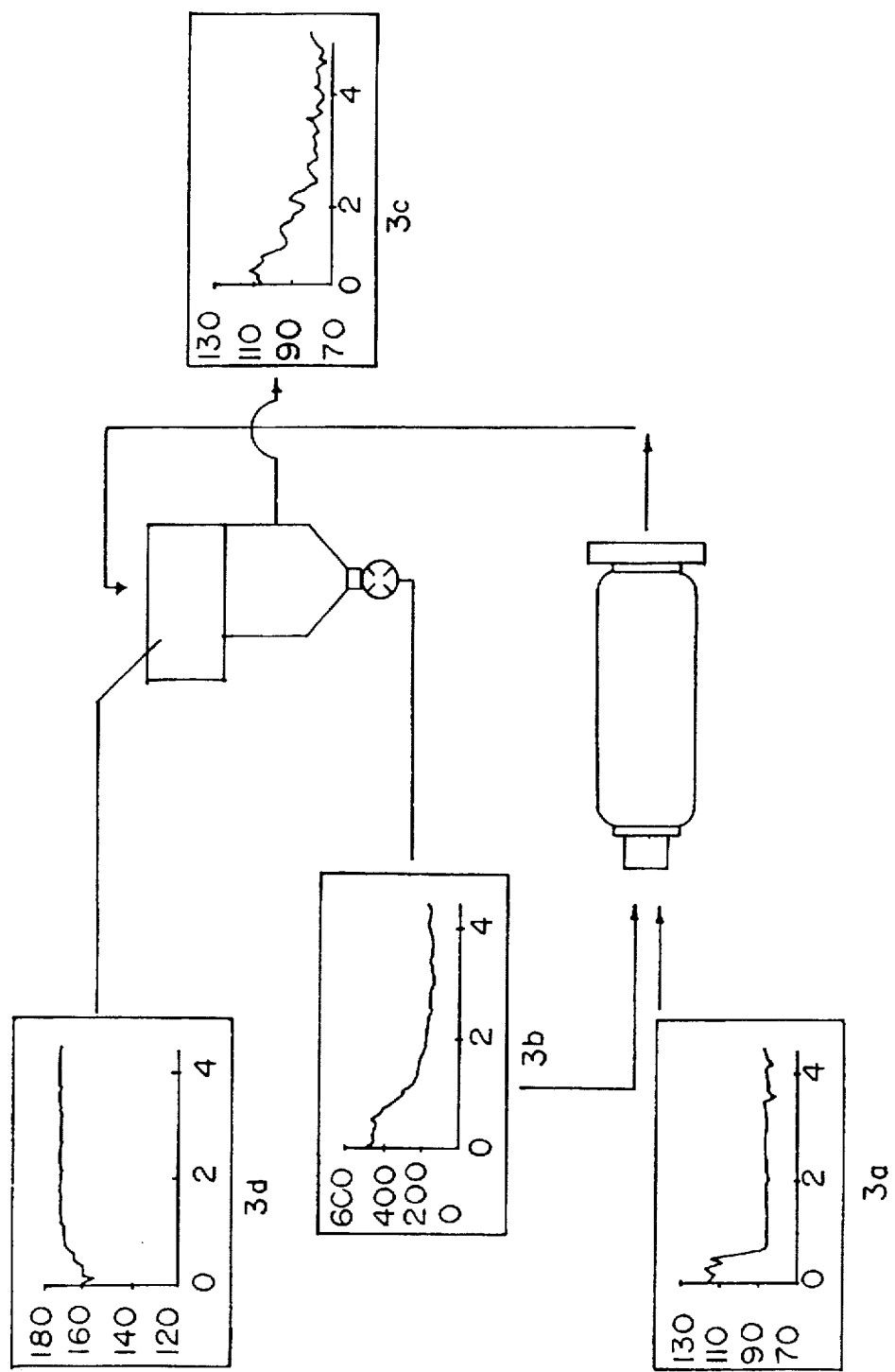
FIG. 3 gives by means of four graphs 3a, 3b, 3c, 3d, the variation in the oversize flow rate (3b), the finished product flow rate (3c) and the speed of the separator (3d) as a function of an induced variation in the raw materials feed flow rate (3a) for an installation similar to that of FIG. 1 and equipped with a regulator for the implementation of the process according to the invention.

By way of illustration of the step trial on the feed flow rate, in FIG. 3, the graphs 3a, 3b, 3c, 3d give respectively, as ordinate, the flow rates (in tonnes per hour) of the feed of raw materials, of oversize, of finished product, and the speed of the separator (in revolutions per minute) as a function of time (in hours) given as abscissa.

Figure 4:
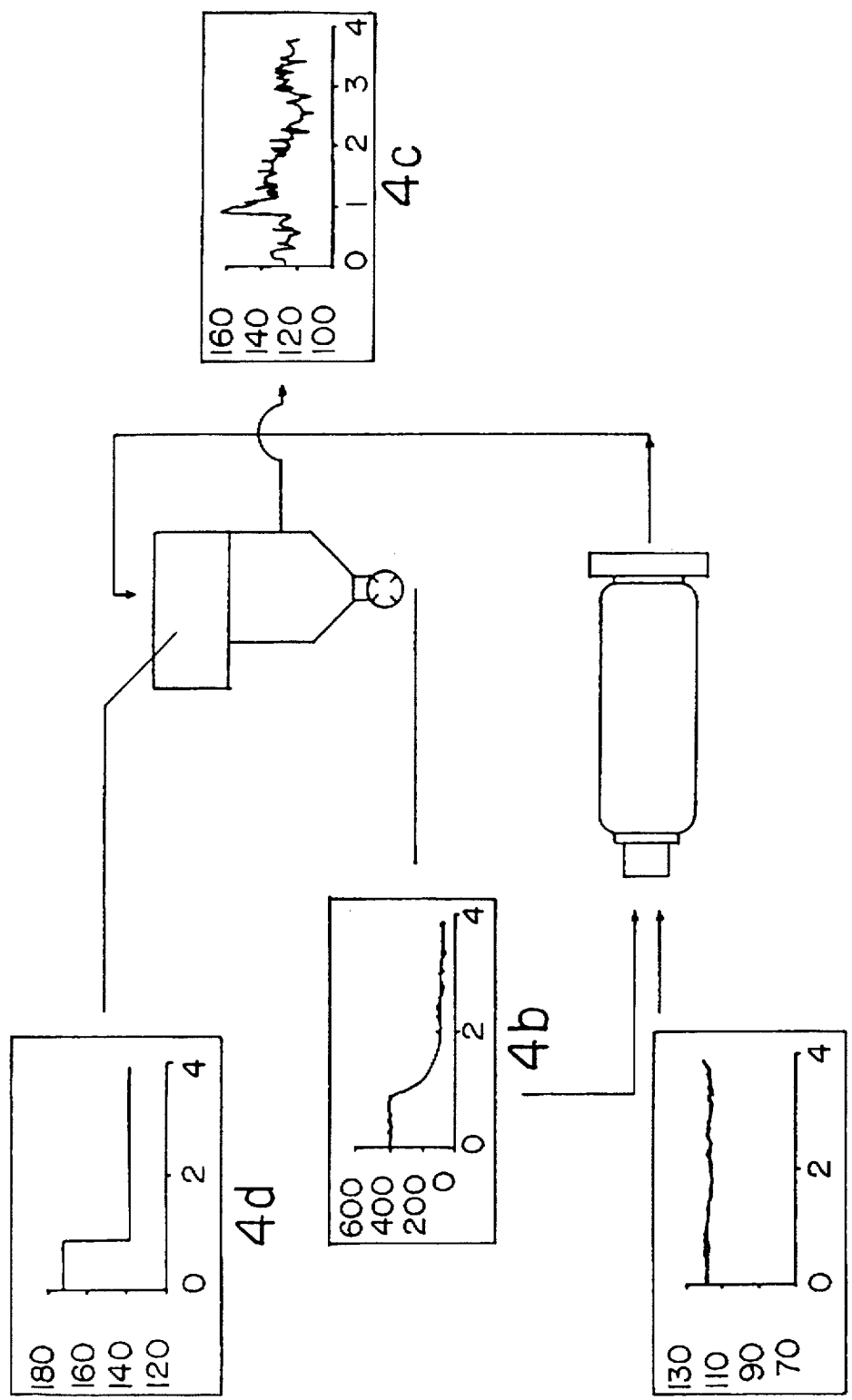
FIG. 4 gives by means of 4 graphs 4a, 4b, 4c, 4d, the variation in the raw materials feed flow rate (4a), the oversize flow rate (4b) and the finished product flow rate (4c) as a function of an induced variation in the speed of the separator (4d) for an installation similar to that of FIG. 1 and equipped with a regulator for the implementation of the process according to the invention.

By way of illustration of the step trial on the speed of the separator, in FIG. 4, the graphs 4a, 4b, 4c, 4d give respectively, as ordinate, the flow rates (in tonnes per hour) of the feed of raw materials, of oversize, of finished product, and the speed of the separator (in revolutions per minute) as a function of time (in hours) given as abscissa.

Analysis of FIGS. 3 and 4 shown the influence of the raw materials feed flow rate and of the speed of the separator on the finished product and oversize flow rates. The influence of each input on each output shows the importance of the multivariable nature of the model.

On the basis of recordings of the data during the two trials, the classical theory of model fitting is then applied in order to determine the parameters of the model. The latter is then checked and validated on the basis of the first data mentioned above.

Figure 5:
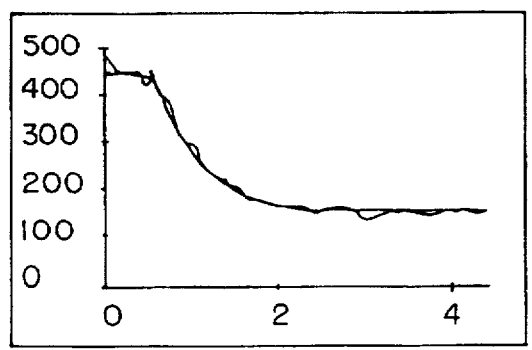
FIG. 5 shows an illustrative fit of the mathematical model for the process according to the invention in which graphs 5a to 5d compare the experimental data with the predictions of the model for the oversize flow rate and the finished product flow rate respectively for the induced variation in the raw materials feed flow rate of FIG. 3 (graphs 5a and 5b), and for the induced variation in the speed of the separator of FIG. 4 (graphs 5c and 5d).
Figure 5:
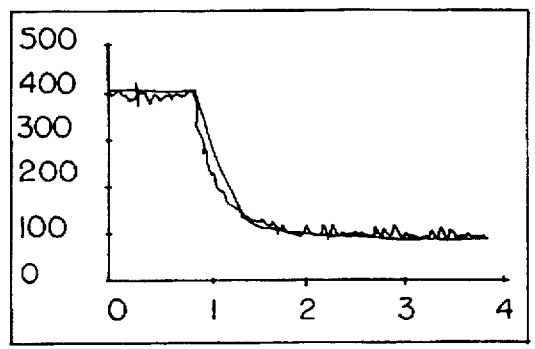
Figure 5:
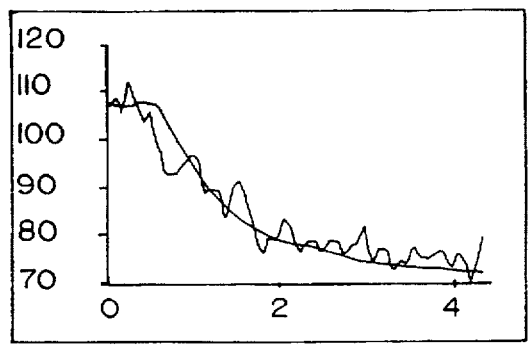
Figure 5:
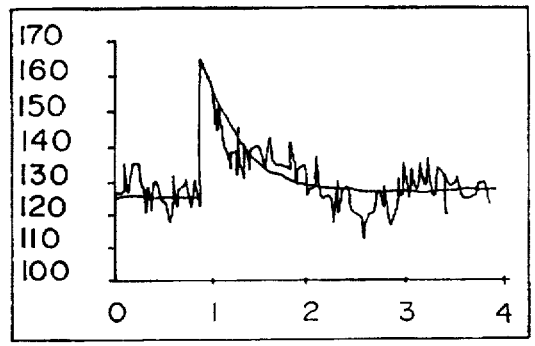

FIG. 5 shows an illustrative fit of the mathematical model. The broken lines represent the experimental data recorded on the installation and the continuous lines represent the predictions made from the model. Graphs 5a and 5b show respectively, as ordinate, the flow rates (in tonnes per hour) of oversize and of finished product as a function of time (in hours) given as abscissa, for the step action trial on the raw materials feed flow rate. Graphs 5c and 5d show respectively, as ordinate, the flow rates (in tonnes per hour) of oversize and of finished product as a function of time (in hours) given as abscissa, for the step action trial on the speed of the separator. The equations of the model relating to the aforesaid curves are recalled below $$(54d/dt+1)y_f = u_a \quad (14)$$

$$(25d/dt+1)y_f = -25du_s/dt \quad (15)$$

$$(39d/dt+1)y_r = 8.6u_a \quad (16)$$

$$(21d/dt+1)y_r = 11u_s \quad (17)$$

2. The Gains of the Multivariable Regulator

The multivariable regulator is adapted to each installation. To do this, on the basis of the mathematical model established in point 1, the gain L of an observer of the internal state, and the gain x which minimizes the quadratic criterion are calculated. The regulator then homes in by simulation in order to optimize the constancy of the finished product and oversize flow rates by acting on the raw materials feed flow rate and the speed of the separator. Equation (11) is used to calculate the gain K and an equation of the same type is used to calculate the gain L.

The weightings of the criteria are chosen in accordance with the classical recommendations, namely:

$$Q_1 = BB^T \quad (18)$$

$$Q_2 = C^T C \quad (19)$$

$R_1$ and $R_2$ are two diagonal matrices whose non-zero diagonal elements constitute the design parameters of the regulator.

Figure 6:
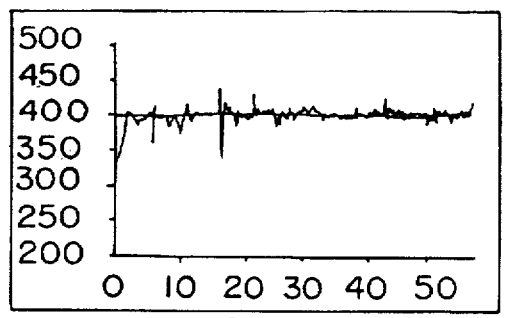
FIG. 6 compares, in the two upper graphs (6b and 6c), the settings in oversize flow rate and in finished product flow rate with the measured data, for the separator speeds and raw materials feed flow rates given in the lower graphs (6d and 6a) for an installation equipped with a multivariable regulator for the implementation of the process according to the invention.
Figure 6:
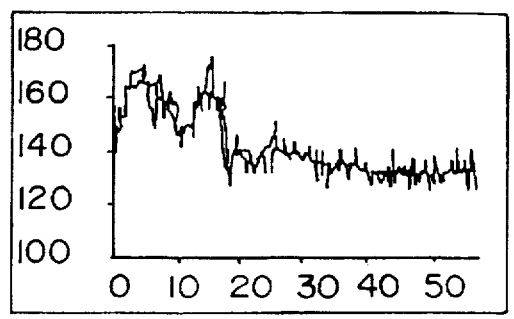
Figure 6:
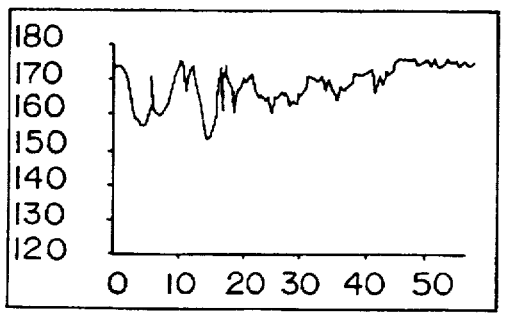
Figure 6:
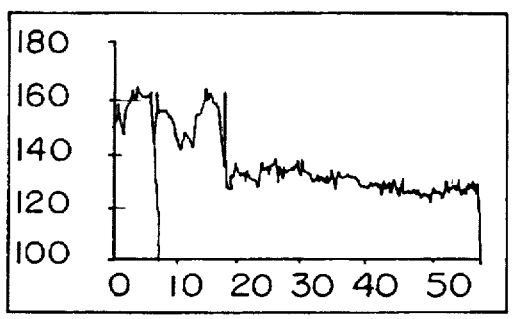

By way of illustration of the holding of the settings by virtue of the multivariable regulator implemented, in FIG. 6, graphs 6a, 6b, 6c, 6d show respectively, as ordinate, the flow rates (in tonnes per hour) of the feeding of raw materials, the oversize, and the finished product, and the speed of the separator (in revolutions per minute) as a function of time (in hours) given as abscissa. In graphs 6b and 6c the heavy lines show the settings for oversize and for finished product respectively and the thin lines show the data measured on the installation, for the separator speeds and raw materials feed flow rates given in graphs 6d and 6a respectively.

3. The Parameters of the Calculator

After having implemented the multivariable regulator in the installation, trials will be carried out to assess the calculator. Variations in the finished product setting are applied so as to observe their influence on the dynamic range of the speed of the separator.

Figure 7:
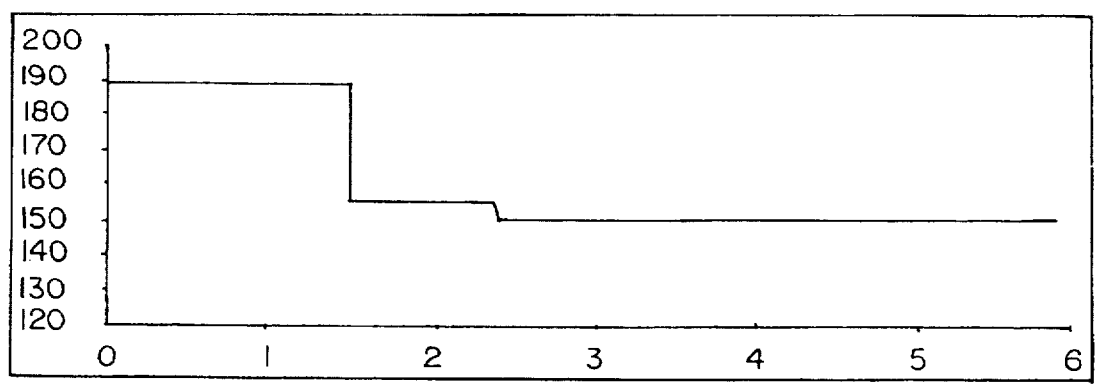
FIG. 7 shows with the aid of two graphs 7a and 7b a trial implementation of the calculator. The upper graph show the variations induced in the finished product flow rate setting; the lower graph shows the variations induced in the separator speed.
Figure 7:
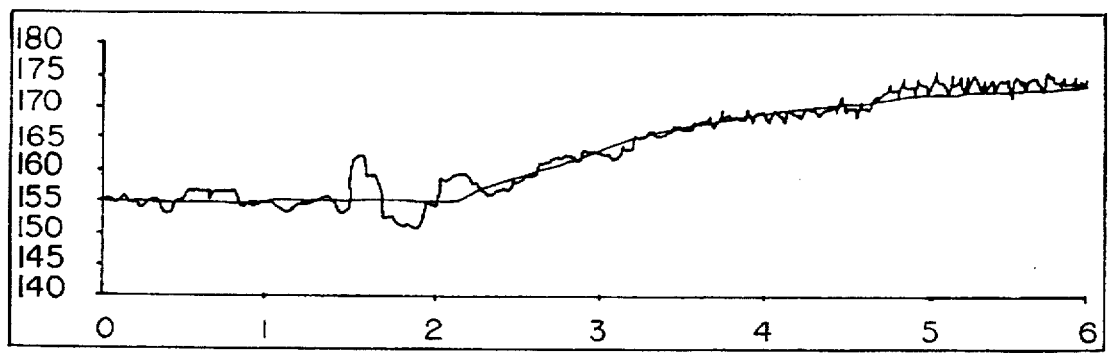

By way of illustration of the testing of the finished product setting, in FIG. 7, graphs 7a, 7b give respectively, as ordinates, the finished product flow rate setting (in tonnes per hour) and the speed of the separator (in revolutions per minute) as a function of time (in hours) as abscissa. The variations induced in the flow rate setting, as given in graph 7a, provoke variations in the measured data for the speed of the separator, as shown in graph 7b.

On the basis of the illustrative test described in FIG. 7, an assessment of the influence of the variation in the finished product setting on the variation of the speed of the separator is established and makes it possible to calculate the parameters of the calculator; for example the proportional and integral coefficients of a proportional integral regulator (PI).

I claim:

1. Control system for a closed-circuit and dry process grinding installation that essentially comprises a batching device for the feeding of raw materials, a grinder, an adjustable-speed dynamic separator, means for bringing to the separator the matter coming from the grinder which is termed feeding of the separator, means for returning to the grinder the insufficiently ground matter coming from the separator which is termed oversize from the separator, means for conveying the finished product, a flowmeter for the oversize from the separator, and means for measuring a datum dependent on the feeding of the separator, the latter being either the feed of the separator itself or the power of the elevator or the flow rate of the finished product or the flow rate of the raw material;

said control system being activated by:

a setting value (a) for the flow rate of oversize from the separator, an auto-adjustable setting value (b) for the datum dependent on the feeding of the separator, a reference value (c) for the speed of the separator, and in that a multivariable regulator simultaneously controls the actual value of the flow rate of oversize from the separator and the actual value of the datum depending on the feeding of the separator and keeps them constant with reference to the setting values (a) and (b) by acting on the speed of the separator and a quantity of raw material fed into a mill, the actual speed of the separator being constantly compared with the reference value (c) in such a way that, should the actual speed deviate from the speed of reference (c) for a period of time exceeding a set value, a auto-adjustable setting value (b) is automatically modified by the calculator to reach a new setting value (b) that will enable the speed of the separator to be equal again to the reference value (c), the result of the calculation being transferred to the regulator that modifies the setting value (b) accordingly while keeping the setting value (a) unchanged.

2. Control process according to claim 1, wherein the datum dependent on feeding of the separator is the feed of the separator.

3. Control process according to claim 1, wherein the datum dependent on the feeding of the separator is the flow rate of the finished product.

4. Application of the process according to claim 1 to installations comprising a ball mill.

5. Application of the process according to claim 1 to installations comprising a pebble mill.

6. Application of the process according to claim 1 to installations comprising a compression mill.

7. Control for a closed-circuit and dry process grinding installation that essentially comprises a batching device for the feeding of raw materials, a grinder, an adjustable-speed dynamic separator, means for bringing to the separator the matter coming from the grinder which is termed feeding of the separator, means for returning to the grinder the insufficiently ground matter coming from the separator which is termed oversize from the separator, means for conveying the finished product, a flowmeter for the oversize from the separator, and means for measuring a datum dependent on the feeding of the separator, the latter being either the feed of the separator itself or the power of the elevator or the flow rate of the finished product or the flow rate of the raw material;

the control system being activated by:
 a setting value (a) for the flow rate of oversize from the separator,
 an auto-adjustable setting value (b) for the datum dependent on the feeding of the separator,
 a reference value (c) for the speed of the separator;

and in that a multivariable regulator simultaneously controls the actual value of the flow rate of oversize from the separator and the actual value of the datum depending on the feeding of the separator and keeps them constant with reference to the setting values (a) and (b) by acting on the speed of the separator and the quantity of raw material fed into a mill, the actual speed of the separator being constantly compared with the reference value (c) in such a way that, should the actual speed deviate from the speed of reference (c) for a period of time exceeding a set value, the auto-adjustable setting value (b) is automatically modified by a calculator to reach a new setting value (b) that will enable the speed of the separator to be equal again to the reference value (c), the result of the calculation being transferred to the regulator that modifies the setting value (b) accordingly while keeping the setting value (a) unchanged, the multivariable regulator being constructed from a mathematical process model establishing the relationships which exist between the flow rate of the feeding of raw materials and the speed of the separator as control variables and the flow rate of oversize and the flow rate of the datum dependent on the feeding of the separator as values to be controlled, the mathematical model being specified by the following system of equations:

$$t_{11}\frac{dy_f}{dt} + y_f = k_{11}u_a$$

$$t_{12}\frac{dy_f}{dt} + y_f = k_{12}\frac{du_s}{dt}$$

$$t_{21}\frac{dy_r}{dt} + y_r = k_{21}u_a$$

$$t_{22}\frac{dy_r}{dt} + y_r = k_{22}u_s$$

in which:
 $y_f$ is the flow rate of finished product,
 $y_r$ is the flow rate of the oversize from the separator,
 $u_a$ is the flow rate of feeding of raw materials,
 $u_s$ is the speed of the separator,
 $t_{11}$, $t_{12}$, $t_{21}$, $t_{22}$ are the time constants, and
 $k_{11}$, $k_{12}$, $k_{21}$ and $k_{22}$ are the process gains.

8. Control process according to claim 7 wherein the multivariable regulator is linear quadratic, its control minimising a quadratic cost criterion relating it to the internal state.

* * * * *